H. M. NIPPES.
APPARATUS FOR CUTTING ASPARAGUS STALKS.
APPLICATION FILED APR. 25, 1911.
1,046,485.
Patented Dec. 10, 1912.
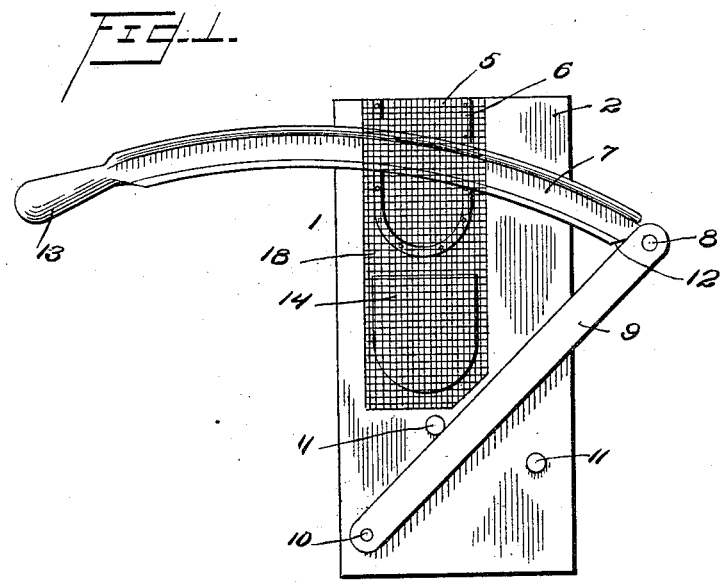
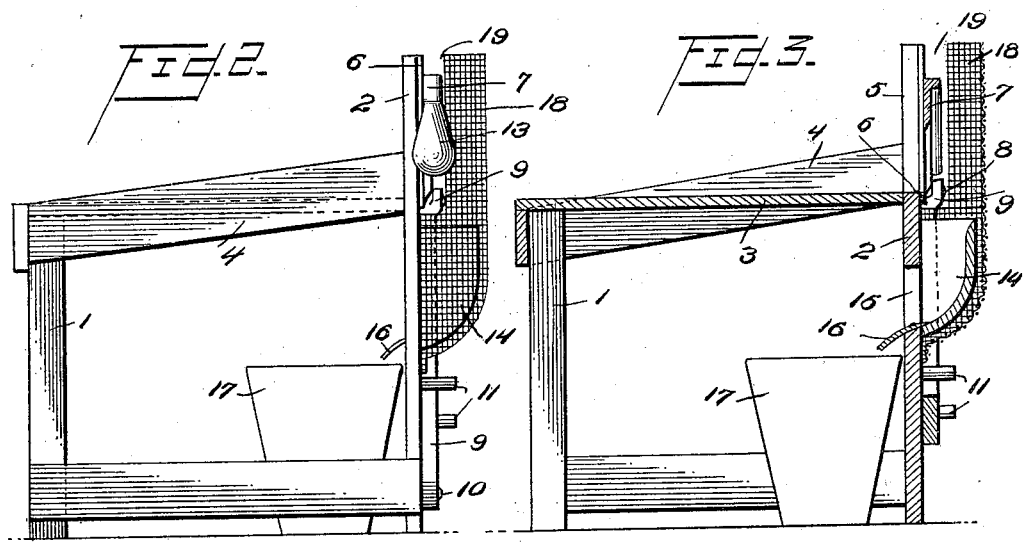
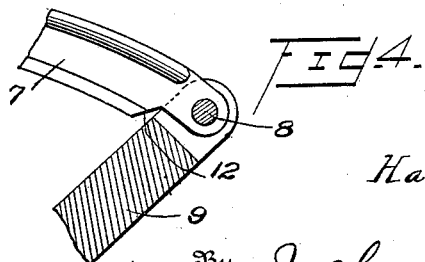
Inventor
Harry M. Nippes
By Joshua R. H. Potts
Attorney
Witnesses
H. Strauss
R. H. Krenkel

UNITED STATES PATENT OFFICE.

HARRY M. NIPPES, OF IVYLAND, PENNSYLVANIA.

APPARATUS FOR CUTTING ASPARAGUS-STALKS.

1,046,485.  Specification of Letters Patent.  Patented Dec. 10, 1912.

Application filed April 25, 1911. Serial No. 623,309.

*To all whom it may concern:*

Be it known that I, HARRY M. NIPPES, a citizen of the United States, residing at Ivyland, in the county of Bucks and State of Pennsylvania, have invented certain new and useful Improvements in Apparatus for Cutting Asparagus-Stalks, of which the following is a specification.

My invention relates to improvements in apparatus for cutting asparagus stalks, the object of the invention being to provide improved means for quickly cutting off the stalks of a bundle of asparagus, so that the end of the bundle will be straight and smooth, and provide improved means for guiding the cut end of the stalks into a receptacle provided for the purpose.

A further object is to provide improved means for supporting the bundle of stalks while being cut, to provide improved cutting means and improved guiding means for the cutter, which insure a shear cut, and a ready severance of the stalks.

With these and other objects in view, the invention consists in certain novel features of construction, and combinations and arrangements of parts, as will be more fully hereinafter described and pointed out in the claim.

In the accompanying drawings: Figure 1, is an end view illustrating my improvements. Fig. 2, is a view in side elevation. Fig. 3, is a view in longitudinal section, and Fig. 4, is a fragmentary sectional view illustrating the pivotal connection between the knife and its supporting link.

1, represents the framework of my improved apparatus having an end board 2, which extends above a horizontal table or platform 3, upon which the asparagus stalks are supported, and the side parts 4 of this top 3 are inclined so as to assist in guiding the stalks into place.

End board 2 is provided with a U-shaped opening 5, which is preferably outlined with a metal strip 6 to form a smooth metal surface against which the blade 7 is adapted to cut. This blade 7 is slightly curved, and at one end is pivotally connected by means of a pin 8 in the bifurcated end of a link 9.

Link 9 is pivotally secured by means of a pin 10 to the end board 2, and its pivotal movement is limited by stops 11. It will be noted that the blade or cutter 7 is provided adjacent its pivoted end, with a shoulder 12, which is adapted to engage link 9, and limit the pivotal movement of the blade in one direction with reference to the link, and this has a definite purpose as will hereinafter be explained.

The blade itself, exerts a shear cut against the metal outline 6 on the outer face of end 2, when said blade is manipulated which is readily effected by the operator grasping the handle 13 on the free end of the blade, and positioning the bundle of asparagus through the U-shaped opening 5. In other words, the asparagus with its uneven stalks is positioned in the opening 5, and held by one hand, while the operator with his other hand draws downward blade 13, and at the same time moves the blade longitudinally. These two movements give a shear cut which readily severs the stalks, and the cut ends of the stalks fall into a hopper 14 below. This hopper 14 communicates with an opening 15 in end 2, and is provided with a spout 16 to guide the ends of the stalks into a bucket or other receptacle 17 provided for the purpose.

To inclose the opening 5 and insure every piece of stalk passing down into the hopper 14, a wire netting 18 is secured to the end 2, and this netting or screen 18 is cut out as shown at 19 to accommodate the blade or cutter 7. The screen also serves the function of shielding the blade or cutter.

One great advantage of my improved structure is the shear cut that is obtained, and this is made positive by reason of the shoulder 12 and the stops 11. This prevents a complete pivotal movement of the blade to sever the stalks, and it also prevents a complete sliding movement, but compels a combination of both, and by such combined movement, the stalks may be easily and cleanly cut.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A device of the class described, comprising a platform, an end board supporting one end of said platform and extending above the same, said board being provided with two openings one above the other, the bottom of the uppermost opening being on a level with the upper face of said platform and the lowermost opening being below said platform, a hopper fixed to the outer face of said end board and opening into the lowermost of said openings, a screen surrounding said hopper and extending upwardly above the uppermost opening, said screen being cut away upon each side of the upper openings, a pivoted cutting blade extending through the cut away portion of said screen and a stop for said blade, substantially as described.

In testimony whereof I have signed my name to this specification in the presence of two subscribing witnesses.

HARRY M. NIPPES.

Witnesses:
R. H. KRENKEL,
CHAS. E. POTTS.

Copies of this patent may be obtained for five cents each, by addressing the "Commissioner of Patents, Washington, D. C."